(No Model.) 3 Sheets—Sheet 1.
J. H. KINSMAN.
TELEPHONIC APPARATUS.
No. 288,449. Patented Nov. 13, 1883.
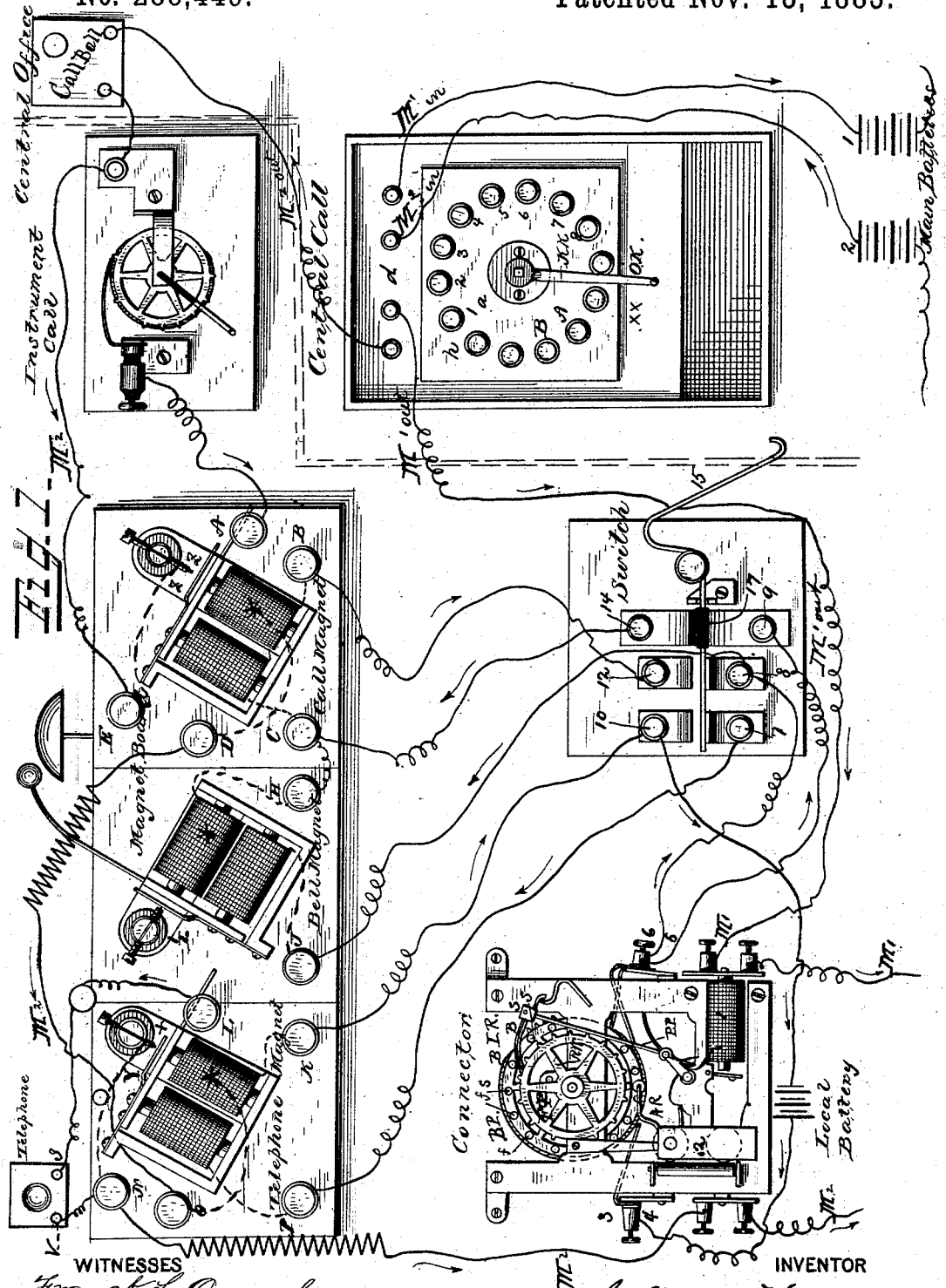
WITNESSES
Franck L. Ourand
Wm A Garner
INVENTOR
John H. Kinsman
per L. Deane
his ATTORNEY (No Model.)
J. H. KINSMAN.
TELEPHONIC APPARATUS.
No. 288,449. Patented Nov. 13, 1883.
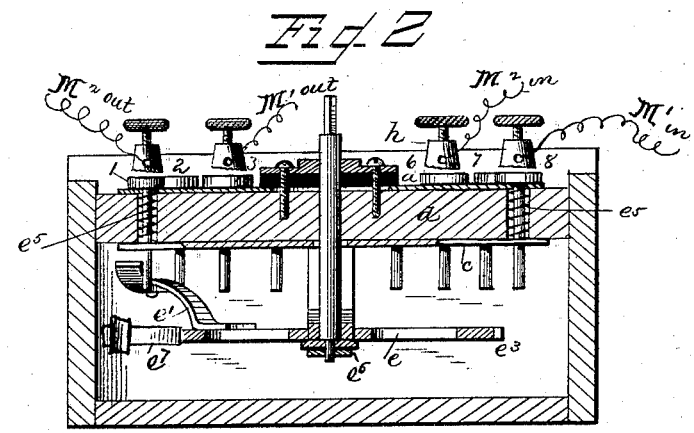
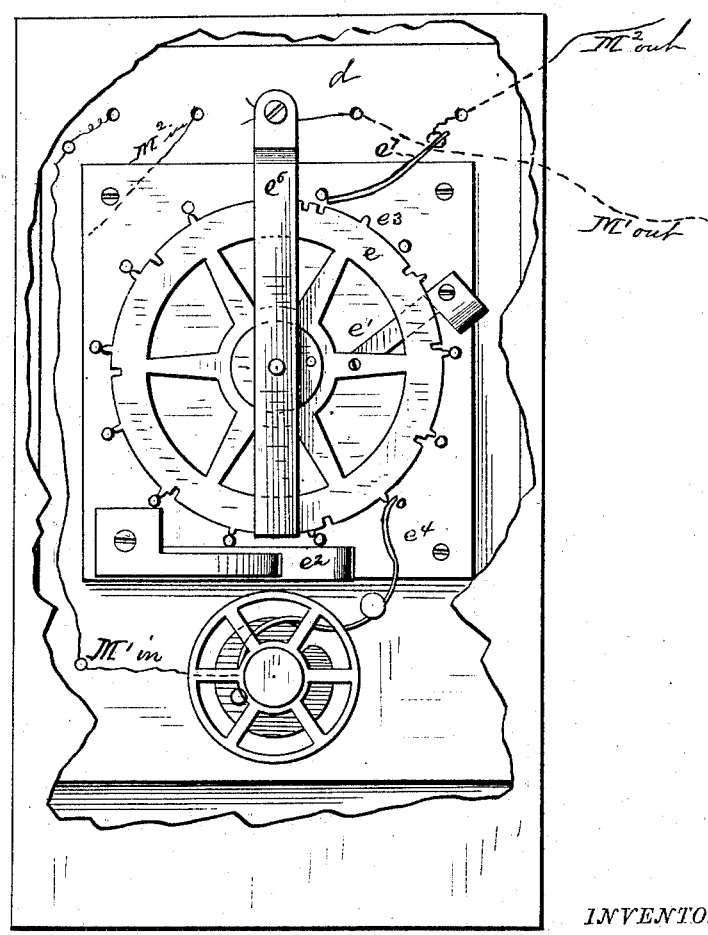
WITNESSES
INVENTOR (No Model.) 3 Sheets—Sheet 3.

J. H. KINSMAN.
TELEPHONIC APPARATUS.

No. 288,449. Patented Nov. 13, 1883.

WITNESSES
Franck L. Ourand
Wm A Garner

INVENTOR
John H. Kinsman
per L. Deane
his Attorney

UNITED STATES PATENT OFFICE.

JOHN H. KINSMAN, OF RYE, NEW YORK.

TELEPHONIC APPARATUS.

SPECIFICATION forming part of Letters Patent No. 288,449, dated November 13, 1883.

Application filed March 21, 1883. (No model.)

*To all whom it may concern:*

Be it known that I, JOHN H. KINSMAN, a citizen of the United States, residing at Rye, in the county of Westchester and State of New York, have invented certain new and useful Improvements in Telephonic Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 4:
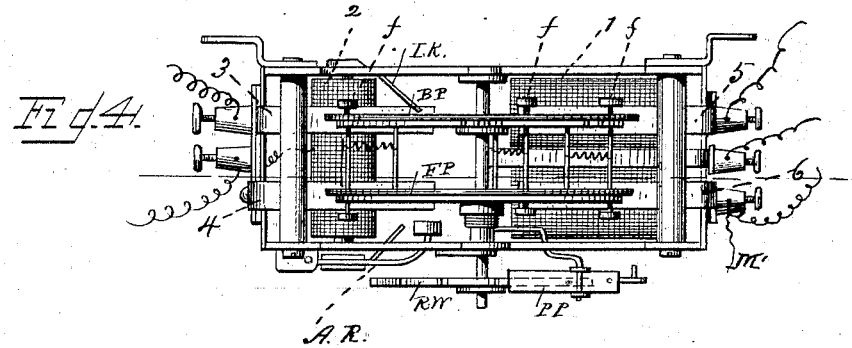
Figure 5:
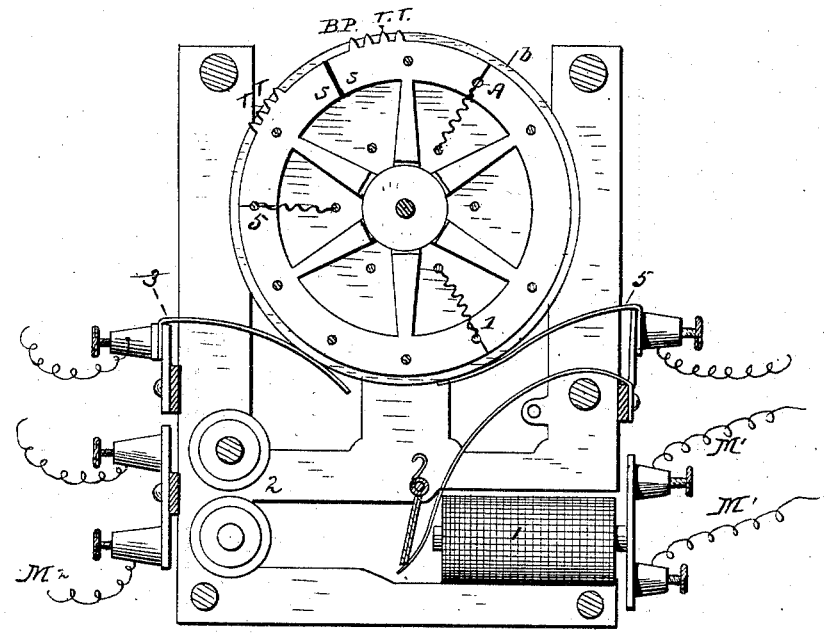
Figure 6:
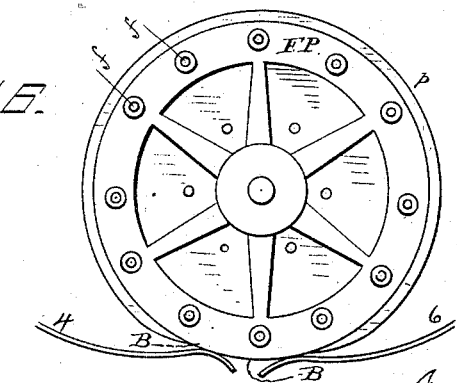

Figure 1 is a diagram of the whole apparatus, illustrating in a bird's-eye view the detail of the operation. Fig. 2 is a cross-section through central call. Fig. 3 is a rear view of same, back broken away to show mechanism; Fig. 4, a plan view of connector; Fig. 5, a longitudinal section in line $x\,x$, Fig. 4; Fig. 6, a detail view of the disks F P.

The object of this invention is to furnish for use upon telephone, telegraph, and other electrical lines an apparatus by means of which, upon a line serving for the use of many instruments, any single one may be called and put in connection with any other instrument or any other several instruments, to the exclusion of all the remaining instruments which have not been so called or connected, while at the same time the communication passing between the instruments connected cannot be overheard or interrupted by any person having access to the other instruments not so connected. To effect this, two main wires, two main batteries, and a local battery for each instrument are necessary for any number of instruments which may be placed upon a circuit. While secrecy of communication is provided for, the annoyance of listening to discover if it is one's own instrument which is called is abolished, as the special call upon one instrument has no effect upon the others. Moreover, the expense and inconvenience of a large number of wires are obviated, because the two wires will serve equally well for five or fifty instruments.

The system consists of two portions, one being situated at the central office, the other at the location of the telephone or instrument in use. The former I designate "central call," the latter "connector."

The central call consists, preferably, of a plate having upon it a number of holes, A B 1 2 3 4, &c., and a back plate, $c$, of metal, having a corresponding number of holes, and separated from the front plate at any convenient distance—say one-half or three-fourths of an inch—by another plate, $d$, having a series of similar holes, but of somewhat greater diameter. This middle plate should be of some non-conducting material. Through the center of the three plates is a hole so large in the front and back plates that they will not touch the spindle of the crank K K, which runs through them and is insulated from them.

It is obvious that the metallic front plate is not either an essential mechanical or electrical element of the central call, but is preferably used for giving firm bearings for the pins and their springs.

Upon the back end of the spindle is a disk or wheel, $e$, having upon its periphery a number of teeth or projections, $e^3$, and upon its inner surface an arm, $e'$, which terminates in some insulating material. The end of the spindle is supported in a bearing in a metal bracket, $e^6$, which is insulated from the rest of the call, but connected with the main wire M' out.

A spring, $e^4$, is so placed that, while insulated from the call, it is connected with the main wire M' in, and makes connection through the disk $e$ when one of the teeth comes in contact with it, but breaks connection when the disk is revolved so as to carry a tooth out of contact with the spring. Another spring, $e^7$, which is connected with the line M$^2$ out, is arranged to make contact with the teeth of the wheel successively immediately after they break contact with spring $e^4$.

Instead of teeth upon the disk, the surface may be covered with a non-conductor for the springs to rest upon, which may be cut away whenever metallic contact is necessary.

Through the holes A B 1 2 3 4, &c., pass metal pins $h$, of such length that when pushed in they will touch the metal portion of the arm $e'$ on the toothed disk $e$. These pins are in contact with the back plate where they pass through the holes, and to make the contact more certain, the holes in the insulating-plate are made large enough to contain spiral springs $e^5$, which rest upon the front and back plates, and, being slightly longer than the passages which contain them, are necessarily curved somewhat, and thus keep a close connection between the pins and the plate. Connected with the back plate is a friction-spring, $e^2$, made either in one or two pieces, which presses upon the metal arm of the toothed disk when the crank K K is opposite O K or X X upon the front plate, serving to maintain connection, when the disk is not being rotated, with the back plate, which in its turn is in connection with the main wire $M^2$ in.

The action of this part of the apparatus is as follows: When the crank K K is turned, the toothed wheel is revolved, and whenever a tooth or metallic portion passes over the spring $e^4$, which is opposite its periphery, the current passes from main battery 1 in through the spring, the toothed disk, the spindle, and bracket $e^6$, to the wire M' out, and along the line to the magnet 1 of each connector, attracting the armature or pawl P P of each one and turning the ratchet-wheel R W of each one one space forward. Consequently, when the crank K K has made one revolution, the wheel of each connector has also made one, since it has the same number of projections, and has returned to its former position. Now push down any of the pins A B 1 2 3 4, &c. Then, when the disk is revolved, not only the current from M' in traverses it, but when the metal arm upon it comes in contact with a pin the current from main battery 2 in also passes into the disk, and thence over spring $e^7$ to line $M^2$ out. As the disk revolves the curved form of the arm $e'$ causes the pin to be pushed back to its former position and cuts off the current of $M^2$ out. To make certain that in any revolution of the disk a connection should not be accidentally made, the extremity of the arm $e'$ is a non-conductor, so that a casual striking of a pin which is not purposely pushed down will not cause a current. Thus it will be seen that immediately after a current is sent over line M' out a current is sent over line $M^2$ out, and a current is always upon line $M^2$ out when the apparatus is in its normal condition and the spring $e^2$ is in contact with the arm $e'$. The current on $M^2$ out proceeds along the wire to the connector, and, passing through the magnet 2, continues its course to the next one. Each time that connection is made by a pin the armature is attracted upon every connector and the arm A R put in motion; but the passage of the current on $M^2$ is not so simple as that upon M', whose only duty is to cause the revolution of the wheel of the connector. The current $M^2$ serves the call-bell of the central office, the call of each instrument, the call-magnet and telephone-magnet of each instrument, and conveys the messages between the different instruments. Passing from the central call, the current $M^2$ proceeds to the central-office bell, then on the line to the call of the first instrument. From there it goes to what I term the "magnet-board." Here are three magnets. One—the bell-magnet—is connected only with the local battery. The others—the call-magnet and telephone-magnet—are connected both with the local battery and the main 2 battery. On leaving the instrument-call, the current, if the line is not in use, passes to A of the call-magnet, then through the armature and frame to *, then to D, from D to O of the telephone-magnet, then to *, then through the frame and armature to X, then to N, then to the connector-magnet 2, and then out, to repeat the same course on the next instrument. It will be seen that this course does not lead it through the telephone or instrument, so that under these considerations a message can neither be sent nor received; but the call can be used and the bell in the central office rung. Under other conditions, which will be explained in describing the connector and switch, the current of $M^2$ does not pass through the instrument-call, but proceeds to E of the call-magnet, then to Z through the armature, and * to D, then to O of the telephone-magnet, then to *, then to the armature and post L, then to S of the telephone or instrument, then from V to N, at which it before left the magnet-board, and from thence on, as before, to the connector-magnet 2, and so on to the next instrument. Here it will be seen that the telephone or instrument is in connection, and that call is thrown out of connection, so that its use cannot distract the current flowing through $M^2$. The cause of this change in the direction of the current will now be explained by showing the operation of the connector and switch.

The connector consists of two or more plates or wheels, F P and B P, composed partly of metal and partly of some non-conductor, and a toothed wheel, R W, mounted on an axis and capable of being revolved by the pawl P P, which is caused to act by the attraction of magnet 1 when a current flows through the line M'. These wheels are pierced with a number of holes or slots near the periphery. These holes may be round, oval, or V-shaped. The number may be more or less, according to the number of figures to be used in calling. They are placed at a distance from each other corresponding to the distance between the teeth upon the wheel R W, which teeth correspond in numbers with the projections or metallic spaces of contact upon the disk of the central call, so that whenever connection is made by that means with battery M' the pawl P P drives the wheel R W one space forward, thus bringing one hole at a time opposite the arm A R of magnet 2, of which more hereafter. By this means, when the crank K K has marked one revolution, the disks B P and F P have done the same, so that after being set in unison, whenever the crank K K is opposite a number on the central call, the corresponding number on the connector is opposite the arm A R, operated by magnet 2. If, now, any pin upon the central call has been pushed in, when the crank K K reaches that pin the arm upon the toothed disk which it operates presses upon the pin and forms a connection with main battery 2. The current actuates the arm A R of the connector, and if a pin, $f$, should be projecting through the hole of the disk F P, it would be driven in. If several pins are pushed in at the central call, then the arm A R of the connector would push in the pins of the corresponding numbers in the disks F P and B P, provided there were such pins in position. We thus see that the actions of the connector-wheels and the connector-arm depend upon and correspond with the position of the crank K K and the pins A B 1 2 3, &c.

The wheels F P and B P are insulated from each other and from the connector-frame by a non-conducting substance—as, for example, hard rubber. The metal part of the disk F P is mounted upon a disk of rubber, $b$, which projects slightly beyond the metal, except at one point, B B, where it is cut away, or where the metal projects to allow the springs 4 and 6 of the connector to come at certain times in contact with the metal. The disk B P is mounted in the same general way, but, instead of being in one piece, consists of several segments slightly separated from each other at the apertures through which the pins pass. On this disk B P the rubber $b$ is either cut away at two points or the metal projects, as at T T T T, to allow the springs 3 and 5 to come at certain times in contact with the metal. The projection of the metal or the cutting away of the rubber is a matter of mechanical choice, the object being simply to allow contact between the springs and the metal disk.

The pins $f$, of which mention has been made, are of metal, part of which is exposed and part covered by some non-conductor, as rubber, glass, enamel, or any article of that nature. They are either headed or bent over to prevent them slipping too far through the apertures. When the connector is not in operation, the pins project a short distance from the face of the disk F P, the apertures in the metal portion of it being made larger than those in the rubber part, to guard against metallic contact. In the back disk, B P, on the contrary, the apertures in the rubber $b$ are the larger, so as to insure metallic contact when the pin is pushed in. The end of the pin which rests in the aperture of the back disk, B P, is made of or covered with a non-conductor, which closes at a certain distance, where the metal of the pin is exposed, this distance being such that when the pin is pushed in by the arm A R the non-conducting part is pushed beyond the disk B P and the metallic part comes in contact with the metallic part of B P. These pins are retained in position, either projecting or pivoted in, by small springs attached in any suitable manner. One or several pins may be used; but whenever a pin is employed a separation of the metal disk is made at the aperture through which it passes, so that a current could not pass from one segment to another. When the instrument is not in use, the insulated portion of the pin rests in the aperture; but when the pin is pushed in, the metal portion, coming in contact with both segments, will permit the passage of a current, provided other conditions exist, which will be explained further on. The black portions of the pins are of insulating material, the other portions being of metal.

Behind the disk B P is an inclined slip, I R, which serves to push back to their first position the pins after they have been pushed in by the arm A R, have performed their function, and are being carried around to their original situation by the revolution of their disks.

With each instrument is a local battery, L B, having no connection with the main battery, but operating upon the telephone-magnet, bell-magnet, and call-magnet through the connector and switch, which operation will now be described.

When not in use, the connector-disks are in such position that the metal portion B B of the disk F P rests upon the springs 4 and 6, while the insulated portion of the disk B P rests upon the springs 3 and 5. The springs 3 and 4 are connected with each other (simply for convenience) and with one pole of the local battery, while the springs 5 and 6 are insulated from each other and connected with separate points on the switch. Now, a current from the local battery, passing to 3 and 4, cannot pass from 3 to 5 or from 4 to 5, on account of the insulation, but can pass from 4 to B B, then to 6, and then to the switch, which we will here proceed to describe.

The switch consists of the metallic rod 15, covered for a short distance, at 17, with a non-conductor, and of several bearing-points so placed and connected by wires that by one movement the central-office bell and the instrument-bell magnet are cut out and the telephone or instrument connected for use, and by another movement the telephone or instrument is cut out and the instrument-bell magnet and central-office bell put in connection, one with the local, the other with the main, battery.

When the instrument is not in use, the rod 15 is held against the bearings 10 12 14 by a weight, such as the ear-trumpet of the telephone or any other suitable means. The current from the local battery passes by the spring 4 to B B, then to 6, then to 9, then to 14, then to C of the call-magnet. It cannot pass from C to H, to J, to 8, to 5, because the spring 5 is resting upon a non-conductor, and that also is the pole of the battery from which it started. It is therefore forced to pass from C to B of the call-magnet, then to 12, through the bar to 10, and then to the other pole of the local battery. The passage of this current, which is always in action when the instrument is not in use, causes the armature W of the call-magnet to be held in contact with the post A, thus allowing the current of M² to run through the instrument-call. This is the state of rest. The crank K K of the central call is at O K, and the current M² is flowing through the central bell and the instrument-call and connector-magnet 2 of each instrument, while the local current of each instrument is flowing through its own call-magnet.

As before stated, the number and position of pins in the connector are governed by the number we wish to have the bell respond to. Take, for example, A 15. This will take three pins, one at each of the apertures corresponding to A, 1, and 5 on the central call. At each of these apertures the metal plate of the disk B P will be divided. The other apertures will have no pins and will not be divided. To call A 15, push in at the central call the pins A, 1, and 5; then turn the crank to the right. When the crank has passed X X, the connection of M² is broken by the metallic arm of the toothed wheel being carried out of contact with the spring which makes electrical connection with it and the back plate, and the arm A R of the connector is released from the magnet 2. As the first tooth or metal space of the central-call disk makes connection with M' out, the current passing to magnet 1 of the connector acts upon the pawl P P and drives forward the disks one interval. By this movement the metal connection between B B and the springs 4 and 6 is broken, the armature of the call-magnet springs back to the post Z, and the current of M², instead of passing through the instrument-call, passes to post E, then to Z, to *, to D, and when battery M² is again closed continues on its course, as before. Thus it is seen that the current M² can pass by one route or the other, whether the local current is flowing or absent. The distance of one interval gone over by the disks of the connector has brought the springs 3 and 5 in metallic connection with the disk B P by means of projections T T and T T; but as there is a separation at S S, no current can flow by that route, neither can it pass around the periphery, because there are separations at A, at 1, and at 5. The crank K K is turned one more interval, and the pawl P P turns the disks one interval, bringing the pin in the A hole opposite the arm A R of magnet 2. The crank is turned a little farther, the arm behind touches the point of A of the central call, the magnet 2 attracts its armature, and the arm A R drives in the pin which is in front of it, the insulated part of the pin passes beyond the aperture in the disk B P, and the metal portion of it lies in contact with the two metallic segments; but still no current flows, because the pins which correspond to 1 and 5 of the central call have not connected their segments. Continuing the operation, the disks revolve, the pins 1 and 5 are pushed in and connect the segments, and the crank reaches O K, from which it started. Here again the springs 4 and 6 are in connection, as at first, the current of the local flows again through the call-magnet, the armature is drawn against post A, and the current of M² again flows, as at first, through the instrument-call, but only momentarily, for although the pins in the central call have resumed their former position and the disks have done the same, the pins of the disks are all pushed in and form metallic communication between the different segments of wheel B P. Turn the crank one more interval to X X. The metallic projections T T and T T form connection with the springs 3 and 5. The local current cut off from 4 to 6 flows from 3 through the segments and metallic parts of the pins A and 1 and 5 around to T T and the spring 5, then to 8 on the switch, then to J, and through the bell-magnet, then to H, then to C of the call-magnet. It cannot pass from C to 14, to 9, to 6, because this path is cut off from 6 to 4, and, moreover, that is the pole from which it started. Neither can it pass from 14 along the switch-rod to 10 and then to the other pole of the local battery, because at 17 there is a non-conductor, so that rod 15 has no metallic connection with spring or point 14. It is therefore obliged to continue from C to B through the call-magnet, then to 12 of the switch on the rod, to 10, and then to the local battery. The current passing through the bell-magnet rings the bell before passing through the call-magnet. As this bell is a vibrator, it causes also a vibration of the armature of the call-magnet, and this, as it vibrates from 2 to A, breaks correspondingly the current flowing in M² and causes the central-office call-bell to vibrate also, although it is in structure a single stroke, for use with the instrument-call. This vibration of the central-office call bell informs the operator that the number he wished to call has been properly signaled, just as a single stroke has warned him whenever perfect connection has been made between the arm a' of the central calling apparatus and any pin which has been pushed down, and consequently that the corresponding pin at the connector has been pushed in. We now have ringing the bell of the instrument which has been called and the bell of the central office to show that all is right. The bell of the instrument called does not sound a number. It simply rings until stopped either by the person called or by revolving the crank at the central office; but as it can only ring when the pins of the number which it represents are in circuit, it follows that a ring means that its instrument is called. To stop the bell and connect the telephone or instrument which is still out of circuit, the weight or other attachment which retains the switch-rod 15 in place is removed. The bearings 10 and 12 are disconnected from the rod by the resilient action of the spring-bearing 9, which also becomes disconnected from 14, and connection between 8 and 7 is made by the fall of the rod upon them. The bell-magnet and call-magnet are disconnected, the circuit through the call is broken, and the current M² is obliged to pass to E, instead of to A. The local current cannot pass from 3 to 5, through 8 to J, and return by C or B to 12 or 14; but it passes from 5 to 8, along the rod to 7, to P, to K, to 10, and back to the other pole of the local battery. The effect of this is to draw the armature of the telephone-magnet away from X and against L. This obliges the current M², which formerly passed from O to *, then to X, to N, and so onward, to now pass from O to *, then to L, then to S of the telephone or instrument which is here interposed, then through this to V, then to N, and then onward. At this stage of affairs the telephone or instrument can be used, the bell is silent, the calls of all the instruments are out of circuit, because the disks of all the connectors stand in the same position; but as only the pins of one of them have been pushed in, only that one has caused its telephone or instrument to be connected with the main wire, and consequently no communication can pass through any instrument not so connected, and no call can be made to interrupt any communication so passing. When the person using the instrument has finished, he depresses again the end 15 of the switch-rod. This throws the instrument out of circuit, rings the bell, as before, vibrates the armature of the call-magnet, and through it the bell at the central office. The crank K K is then turned around until it reaches O K. This stops the bell and rotates the disks F P and B P. The inclined piece I R pushes forward the pins A 1 5 as they pass in front of it, and the metal portion B B of the disk F P, making contact with the springs 4 and 6, as at the commencement, causes the armatures of the call-magnets of all the instruments to be drawn down, and thus puts on all the calls. The inclined piece I R stands in such position that it will not strike the first approaching pin of any combination that has been pushed in until the call has been received or the function of the combination has been accomplished.

In this description only one instrument has been spoken of. Of course, in use there would be at least two, perhaps three or more, for special reasons, to be connected. Neither is it necessary to use the instrument-call, because any number can be called on the central-office call-bell by raising and depressing the switch-rod the requisite number of times. Moreover, in making connection between two instruments the operator at the central office can push down his pins for both instruments at the same time, and the turning of the crank will set both instruments during the same revolution. In fact, this is necessary, for otherwise the second revolution would destroy the combination formed by the first, since the inclined piece I R of the connector would return during the second revolution of the disks the pins which were pushed in during the first one. If necessary, all the instruments upon a line can be set at once by pushing in all the pins upon the central call and turning the crank.

The number of letters and figures of the central call and connector may be increased to any number, provided they are the same upon each, so that the number of instruments or telephones on a line may be as many as can be made available, and as the combination of pins can be made different in each, it will not be possible for the bell of one instrument to sound when some other is called, provided they all revolve in harmony with the central call. If a connector should fail to sound the bell when its number is set at the central office, it can be properly set whenever the crank is at O K simply by turning the disks until the metal of the disk F P connects the two springs 4 and 6. Its failure would be known at the central office because the bell there would not respond.

As before stated, each connector answers only to its own number, because it only has pins for that number. Thus A 15 cannot act when A 16 is called, because, although the pins A and 1 are pushed in in each, there is no pin or division at 6 in A 15 and no pin or division at 5 in A 16; but if it is desired to unite A 15 and A 16, then at the central-call pins A 1 5 6 are pushed in, for in this case the A 1 pins answer for part of each number. The arm A R of each connector-magnet 2 pushes in the required pins in each one, and when the revolution is completed the telephone of each one can be brought in circuit. As the arm A R of each connector acts at the same time, the pins A 1 5 6, in whatever connector they may be, will be depressed; but as the same combination does not exist in any two connectors, only the one having the combination made at the central call will form its connection.

Letters are used, as well as figures, to give a greater number of combinations, and to prevent confusion when two numbers are used, one of which is the reverse of the other—as, for example, 15 and 51. Here, as the same numerical pins are used, both numbers would respond to either call; but by combining A with 15 and B or another character with 51, of course the identity is changed and practically another number substituted. We might add A to all numbers commencing with 1, B to all commencing with 2, C to all commencing with 3, and so on, or by any other analogous mode, many of which will readily present themselves.

What I claim is—

1. A telephonic system comprising the following devices, namely: two main lines, two main batteries at a central office, a circuit-closer at the central office, arranged to close the circuit of one of the lines to one of the batteries at equal intervals when operated, and provided with means for closing the other main line to the other battery at variable intervals during such operation, an automatic connecting mechanism at an outlying station, arranged to operate in response to the currents at regular intervals from one of the main lines, so as to bring local-circuit-closing devices to predetermined position, and devices at the said station arranged to operate said circuit-closers in response to the currents at variable intervals over the other main line, substantially as described.

2. In a telephone system, the combination, with two line-wires, of two main batteries at the central office, a central-office calling apparatus provided with means for closing the circuit of one of the batteries over one of the lines normally when at rest and the line is not in use, and at arbitrarily-variable intervals when operated, and provided, also, with means for closing the circuit of the other battery over the other line at regular intervals when operated, and a series of outlying-station apparatuses, each comprising an electro-magnet and connecting mechanism arranged to be operated for controlling a local-battery circuit when either or both the main-battery currents are intermittently placed on the lines, and also to bring into position a series of circuit-closers arranged to close the local circuit which includes a call-bell, and an electro-magnet arranged to operate said circuit-closers, and a switching mechanism arranged to simultaneously break said local-bell circuit and place a telephone in one of the main lines, substantially as described.

3. The central call composed of the perforated back plate adapted for connection with a battery, the non-conducting perforated plate arranged in front of said back plate, the adjustable pins inserted in the perforations of both plates and in contact with the metallic back plate, the toothed metallic disk or wheel mounted upon an insulated spindle, and provided with a metallic arm arranged to strike the pins when they are pushed in and the wheel rotated, the metal spring connected to a battery and arranged to strike the teeth of the wheel, the metallic spindle-bearing connected to a line-wire, and the contact-spring arranged to strike the teeth of the wheel, and connected to a separate line-wire, substantially as described.

4. The connector composed of the wheel F P, having its margin guarded by insulating material, except at the space B B, and mounted upon a spindle, from which it is insulated, the wheel B P, similarly mounted upon the same spindle, and composed of segments separated from each other, and having its margin guarded by insulating material, except at the metallic projections T T and T T, the pins insulated for a portion of their length and inserted in the perforations in the wheel F P and in the passages between certain segments of the wheel B P, the toothed wheel mounted upon the same spindle with the wheels F P and B P, the pawl-lever for driving said toothed wheel, an electro-magnet for operating said pawl-lever, an electro-magnet having a pivoted armature provided with an arm for striking said pins, the springs 4 and 6, arranged to come in contact with the exposed metallic portion of the edge of wheel F P, and the springs 3 and 5, arranged to come in contact with the exposed metallic portions of the edge of wheel B P, substantially as described.

5. The combination, with the connector, as described, and the local battery, of the switch composed of the contacts 7 8 9 10 12 14, and the rod provided with an insulating covering, 17, the instrument-call or circuit-breaking calling device, the call-magnet, bell-magnet, and telephone-magnet, and the intermediate local and main line conductors, as specified, said main-line conductors having the electro-magnets 1 and 2 of the connector arranged therein, respectively, as set forth.

6. The combination, with the connector, constructed and arranged to operate as specified, the local battery, and the switching mechanism, of the two main lines, the bell-magnet having a retractile armature arranged to strike a bell, the call-magnet having a retractile armature arranged to break and close one of the main lines, the central-office bell included in said main line, and the specified connections from the local battery to the bell and call magnets, the said connector having its magnets 1 and 2 connected in the respective main lines, as set forth.

7. The combination, with the connector-wheels and sliding pins arranged therein, of the inclined piece arranged to press said pins back to their normal positions when said wheels are rotated, after the pins have been pushed in, substantially as described.

8. In a telephone system, the combination, with the central calling apparatus, the two main lines, and two main batteries connected therewith, of the central-office bell included in one of said main lines, and the station apparatus, comprising the connector, local battery, switch, telephone, telephone-magnet, bell-magnet, call-magnet, and the specified intermediate conductors, the whole being constructed and arranged to operate as described.

9. In a telephone system, the combination of two main lines leading from a central office with a telephone normally out of circuit at an outlying station, and adapted for connection in one of said main lines, devices at the said outlying station adapted to connect said telephone in circuit, a local battery arranged to operate said devices, and means controlled by the other main line for connecting said local battery operatively with said devices, substantially as described.

10. In a telephone system, the combination, with two main lines leading from a central office and means at the central office for placing electrical currents upon said main lines, of call-bells, local batteries, and circuit-closers, arranged at outlying stations, respectively, mechanism at the outlying stations for bringing the circuit-closers in position to close the local circuits to the bells, and mechanism controlled by the other main line for operating said circuit-closers, substantially as described, the said circuit-closing mechanisms being arranged to close the local circuit at each station separately, as and for the purpose set forth.

In testimony whereof I affix my signature in presence of two witnesses.

JOHN H. KINSMAN.

Witnesses:
DANL. N. RUSSELL,
THOMAS BARCLAY.